United States Patent
Gottschalk Jr.

(10) Patent No.: US 9,237,152 B2
(45) Date of Patent: *Jan. 12, 2016

(54) SYSTEMS AND METHODS FOR SECURE AND EFFICIENT ENROLLMENT INTO A FEDERATION WHICH UTILIZES A BIOMETRIC REPOSITORY

(71) Applicant: CSIDENTITY CORPORATION, Austin, TX (US)

(72) Inventor: Harold E. Gottschalk Jr., El Cajon, CA (US)

(73) Assignee: CSIDENTITY CORPORATION, Austin, TX (US)

(*) Notice: Subject to any disclaimer, the term of this patent is extended or adjusted under 35 U.S.C. 154(b) by 32 days.

This patent is subject to a terminal disclaimer.

(21) Appl. No.: 14/304,910

(22) Filed: Jun. 14, 2014

(65) Prior Publication Data

US 2015/0295924 A1 Oct. 15, 2015

Related U.S. Application Data

(63) Continuation of application No. 13/236,687, filed on Sep. 20, 2011, now Pat. No. 8,819,793.

(51) Int. Cl.
*G06F 21/00* (2013.01)
*H04L 29/06* (2006.01)

(52) U.S. Cl.
CPC .................................. *H04L 63/0861* (2013.01)

(58) Field of Classification Search
CPC ........... G06F 21/00; G06F 21/32; H04L 9/32; H04L 9/3231; H04L 63/0861
USPC ......................................................... 713/186
See application file for complete search history.

(56) References Cited

U.S. PATENT DOCUMENTS

| | | | |
|---|---|---|---|
| 3,752,904 | A | 8/1973 | Waterbury |
| 5,913,196 | A | 6/1999 | Talmor et al. |
| 5,987,440 | A | 11/1999 | O'Neil et al. |
| 5,999,940 | A | 12/1999 | Ranger |
| 6,125,985 | A | 10/2000 | Amdahl et al. |
| 6,142,283 | A | 11/2000 | Amdahl et al. |
| 6,144,988 | A | 11/2000 | Kappel |
| 6,249,228 | B1 | 6/2001 | Shirk et al. |

(Continued)

FOREIGN PATENT DOCUMENTS

WO WO-2009062111 A1 5/2009

OTHER PUBLICATIONS

Haglund, Two-factor Authentication With a Mobile Phone, Lund University, Nov. 2, 2007, pp. 1-62.*

(Continued)

*Primary Examiner* — Christopher Brown
*Assistant Examiner* — Jenise Jackson
(74) *Attorney, Agent, or Firm* — Winstead PC

(57) ABSTRACT

A method includes receiving data related to an individual, the data comprising a plurality of elements of personally-identifying information (PII). The method further includes building, via the plurality of elements of the PII, a compositional key for the individual. In addition, the method includes storing the compositional key and a biometric print for the individual as a biometric record in a biometric repository. The method also includes, via the compositional key, providing a plurality of federated entity (FE) computer systems with access to the biometric repository.

18 Claims, 6 Drawing Sheets

(56) References Cited

U.S. PATENT DOCUMENTS

| | | |
|---|---|---|
| 6,263,447 B1 | 7/2001 | French et al. |
| 6,269,349 B1 | 7/2001 | Aieta et al. |
| 6,282,658 B2 | 8/2001 | French et al. |
| 6,292,795 B1 * | 9/2001 | Peters .............. G06F 17/30097 |
| 6,321,339 B1 | 11/2001 | French et al. |
| 6,448,889 B1 | 9/2002 | Hudson |
| 6,456,984 B1 | 9/2002 | Demoff et al. |
| 6,496,936 B1 | 12/2002 | French et al. |
| 6,505,193 B1 | 1/2003 | Musgrave et al. |
| 6,510,415 B1 | 1/2003 | Talmor et al. |
| 6,532,459 B1 | 3/2003 | Berson |
| 6,553,495 B1 | 4/2003 | Johansson et al. |
| 6,612,488 B2 | 9/2003 | Suzuki |
| 6,700,220 B2 | 3/2004 | Bayeur et al. |
| 6,740,875 B1 | 5/2004 | Ishikawa et al. |
| 6,751,626 B2 | 6/2004 | Brown et al. |
| 6,811,082 B2 | 11/2004 | Wong |
| 6,829,711 B1 | 12/2004 | Kwok et al. |
| 6,857,073 B2 | 2/2005 | French et al. |
| 6,866,586 B2 | 3/2005 | Oberberger et al. |
| 6,871,287 B1 | 3/2005 | Ellingson |
| 6,913,194 B2 | 7/2005 | Suzuki |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,965,997 B2 | 11/2005 | Dutta |
| 6,973,575 B2 | 12/2005 | Arnold |
| 6,983,882 B2 | 1/2006 | Cassone |
| 6,991,174 B2 | 1/2006 | Zuili |
| 6,993,659 B2 | 1/2006 | Milgramm et al. |
| 7,028,052 B2 | 4/2006 | Chapman et al. |
| 7,035,855 B1 | 4/2006 | Kilger et al. |
| 7,083,090 B2 | 8/2006 | Zuili |
| 7,092,891 B2 | 8/2006 | Maus et al. |
| 7,104,444 B2 | 9/2006 | Suzuki |
| 7,174,335 B2 | 2/2007 | Kameda |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,240,363 B1 | 7/2007 | Ellingson |
| 7,254,560 B2 | 8/2007 | Singhal |
| 7,272,857 B1 | 9/2007 | Everhart |
| 7,289,607 B2 | 10/2007 | Bhargava et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,340,042 B2 | 3/2008 | Cluff et al. |
| 7,370,044 B2 | 5/2008 | Mulhern et al. |
| 7,386,448 B1 | 6/2008 | Poss et al. |
| 7,392,534 B2 | 6/2008 | Lu et al. |
| 7,398,915 B1 | 7/2008 | Pineda-Sanchez et al. |
| 7,438,226 B2 | 10/2008 | Helsper et al. |
| 7,458,508 B1 | 12/2008 | Shao et al. |
| 7,466,235 B1 | 12/2008 | Kolb et al. |
| 7,480,631 B1 | 1/2009 | Merced et al. |
| 7,481,363 B1 | 1/2009 | Zuili |
| 7,490,052 B2 | 2/2009 | Kilger et al. |
| 7,497,374 B2 | 3/2009 | Helsper et al. |
| 7,519,558 B2 | 4/2009 | Ballard et al. |
| 7,522,060 B1 | 4/2009 | Tumperi et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,740 B2 | 6/2009 | Greene et al. |
| 7,548,886 B2 | 6/2009 | Kirkland et al. |
| 7,552,467 B2 | 6/2009 | Lindsay |
| 7,562,814 B1 | 7/2009 | Shao et al. |
| 7,568,616 B2 | 8/2009 | Zuili |
| 7,591,425 B1 | 9/2009 | Zuili et al. |
| 7,593,891 B2 | 9/2009 | Kornegay et al. |
| 7,606,401 B2 | 10/2009 | Hoffman et al. |
| 7,606,790 B2 | 10/2009 | Levy |
| 7,610,229 B1 | 10/2009 | Kornegay et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,921 B2 | 2/2010 | Proux et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,701,364 B1 | 4/2010 | Zilberman |
| 7,707,163 B2 | 4/2010 | Anzalone et al. |
| 7,708,200 B2 | 5/2010 | Helsper et al. |
| 7,711,636 B2 | 5/2010 | Robida et al. |
| 7,720,750 B2 | 5/2010 | Brody et al. |
| 7,735,125 B1 | 6/2010 | Alvarez et al. |
| 7,742,982 B2 | 6/2010 | Chaudhuri et al. |
| 7,747,559 B2 | 6/2010 | Leitner et al. |
| 7,752,236 B2 | 7/2010 | Williams et al. |
| 7,752,554 B2 | 7/2010 | Biggs et al. |
| 7,761,384 B2 | 7/2010 | Madhogarhia |
| 7,774,270 B1 | 8/2010 | MacCloskey |
| 7,779,456 B2 | 8/2010 | Dennis et al. |
| 7,779,457 B2 | 8/2010 | Taylor |
| 7,788,184 B2 | 8/2010 | Kane |
| 7,792,864 B1 | 9/2010 | Rice |
| 7,793,835 B1 | 9/2010 | Coggeshall et al. |
| 7,801,828 B2 | 9/2010 | Candella et al. |
| 7,805,391 B2 | 9/2010 | Friedlander et al. |
| 7,840,459 B1 | 11/2010 | Loftesness et al. |
| 7,860,769 B2 | 12/2010 | Benson |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,874,488 B2 | 1/2011 | Parkinson |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens |
| 7,933,835 B2 | 4/2011 | Keane et al. |
| 1,012,602 A1 | 5/2011 | Beatson et al. |
| 7,950,577 B1 | 5/2011 | Daniel |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,971,246 B1 | 6/2011 | Emigh et al. |
| 7,975,299 B1 | 7/2011 | Balducci et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,271 B2 | 9/2011 | Grant |
| 8,027,518 B2 | 9/2011 | Baker et al. |
| 8,028,168 B2 | 9/2011 | Smithies et al. |
| 8,028,326 B2 | 9/2011 | Palmer et al. |

(56) References Cited

U.S. PATENT DOCUMENTS

| | | |
|---|---|---|
| 8,028,329 B2 | 9/2011 | Whitcomb |
| 8,028,896 B2 | 10/2011 | Carter et al. |
| 8,032,449 B2 | 10/2011 | Hu et al. |
| 8,032,927 B2 | 10/2011 | Ross |
| 8,037,512 B2 | 10/2011 | Wright et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,915 B2 | 11/2011 | Voice et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 2002/0019938 A1 | 2/2002 | Aarons |
| 2002/0042879 A1 | 4/2002 | Gould et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0080256 A1 | 6/2002 | Bates et al. |
| 2002/0087460 A1 | 7/2002 | Hornung |
| 2002/0130176 A1 | 9/2002 | Suzuki |
| 2002/0138751 A1 | 9/2002 | Dutta |
| 2002/0173994 A1 | 11/2002 | Ferguson |
| 2002/0184509 A1* | 12/2002 | Scheidt .................. G06F 21/31 713/185 |
| 2003/0004879 A1 | 1/2003 | Demoff et al. |
| 2003/0009426 A1 | 1/2003 | Ruiz-Sanchez |
| 2003/0046554 A1 | 3/2003 | Leydier et al. |
| 2003/0048904 A1 | 3/2003 | Wang et al. |
| 2003/0057278 A1 | 3/2003 | Wong |
| 2003/0070101 A1 | 4/2003 | Buscemi |
| 2003/0143980 A1 | 7/2003 | Choi et al. |
| 2003/0149744 A1 | 8/2003 | Bierre et al. |
| 2003/0200447 A1 | 10/2003 | Sjoblom |
| 2003/0222500 A1 | 12/2003 | Bayeur et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0026496 A1 | 2/2004 | Zuili |
| 2004/0111335 A1 | 6/2004 | Black et al. |
| 2004/0149820 A1 | 8/2004 | Zuili |
| 2004/0149827 A1 | 8/2004 | Zuili |
| 2004/0153656 A1 | 8/2004 | Cluts et al. |
| 2004/0153663 A1 | 8/2004 | Clark et al. |
| 2004/0158723 A1 | 8/2004 | Root |
| 2004/0230538 A1 | 11/2004 | Clifton et al. |
| 2004/0243514 A1 | 12/2004 | Wankmueller |
| 2004/0243539 A1 | 12/2004 | Skurtovich et al. |
| 2004/0243567 A1 | 12/2004 | Levy |
| 2004/0250085 A1 | 12/2004 | Tattan et al. |
| 2004/0254868 A1 | 12/2004 | Kirkland et al. |
| 2005/0001028 A1 | 1/2005 | Zuili |
| 2005/0005168 A1 | 1/2005 | Dick |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0065874 A1 | 3/2005 | Lefner et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0097364 A1 | 5/2005 | Edeki et al. |
| 2005/0125226 A1 | 6/2005 | Magee |
| 2005/0125686 A1 | 6/2005 | Brandt |
| 2005/0138391 A1 | 6/2005 | Mandalia et al. |
| 2005/0144143 A1 | 6/2005 | Freiberg |
| 2005/0154671 A1 | 7/2005 | Doan et al. |
| 2005/0165667 A1 | 7/2005 | Cox |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0242173 A1 | 11/2005 | Suzuki |
| 2005/0273333 A1 | 12/2005 | Morin et al. |
| 2005/0279869 A1 | 12/2005 | Barklage |
| 2006/0004622 A1 | 1/2006 | Fanelli et al. |
| 2006/0004663 A1 | 1/2006 | Singhal |
| 2006/0041464 A1 | 2/2006 | Powers et al. |
| 2006/0045105 A1 | 3/2006 | Dobosz et al. |
| 2006/0064374 A1 | 3/2006 | Helsper et al. |
| 2006/0074798 A1 | 4/2006 | Din et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129840 A1 | 6/2006 | Milgramm et al. |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0178971 A1 | 8/2006 | Owen et al. |
| 2006/0179004 A1 | 8/2006 | Fuchs |
| 2006/0200855 A1 | 9/2006 | Willis |
| 2006/0204051 A1 | 9/2006 | Holland |
| 2006/0206725 A1 | 9/2006 | Milgramm et al. |
| 2006/0239512 A1 | 10/2006 | Petrillo |
| 2006/0239513 A1 | 10/2006 | Song et al. |
| 2006/0253583 A1 | 11/2006 | Dixon et al. |
| 2006/0255914 A1 | 11/2006 | Westman |
| 2006/0271456 A1 | 11/2006 | Romain et al. |
| 2006/0271457 A1 | 11/2006 | Romain et al. |
| 2006/0271507 A1 | 11/2006 | Anzalone et al. |
| 2006/0271568 A1 | 11/2006 | Balkir et al. |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287902 A1 | 12/2006 | Helsper et al. |
| 2006/0294023 A1 | 12/2006 | Lu |
| 2007/0011100 A1 | 1/2007 | Libin et al. |
| 2007/0016521 A1 | 1/2007 | Wang |
| 2007/0016522 A1 | 1/2007 | Wang |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0061273 A1 | 3/2007 | Greene et al. |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0083460 A1 | 4/2007 | Bachenheimer |
| 2007/0087795 A1 | 4/2007 | Aletto et al. |
| 2007/0100774 A1 | 5/2007 | Abdon |
| 2007/0106517 A1 | 5/2007 | Cluff et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0124270 A1 | 5/2007 | Page |
| 2007/0155411 A1 | 7/2007 | Morrison |
| 2007/0157299 A1 | 7/2007 | Hare |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192853 A1 | 8/2007 | Shraim et al. |

(56) References Cited

U.S. PATENT DOCUMENTS

| | | |
|---|---|---|
| 2007/0198410 A1 | 8/2007 | Labgold et al. |
| 2007/0205266 A1 | 9/2007 | Carr et al. |
| 2007/0214037 A1 | 9/2007 | Shubert et al. |
| 2007/0214076 A1 | 9/2007 | Robida et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0233614 A1 | 10/2007 | McNelley et al. |
| 2007/0234427 A1 | 10/2007 | Gardner et al. |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0291995 A1 | 12/2007 | Rivera |
| 2007/0292006 A1 | 12/2007 | Johnson |
| 2007/0294104 A1 | 12/2007 | Boaz et al. |
| 2008/0027857 A1 | 1/2008 | Benson |
| 2008/0027858 A1 | 1/2008 | Benson |
| 2008/0059236 A1 | 3/2008 | Cartier |
| 2008/0059352 A1 | 3/2008 | Chandran |
| 2008/0059366 A1 | 3/2008 | Fou |
| 2008/0076386 A1 | 3/2008 | Khetawat et al. |
| 2008/0098222 A1 | 4/2008 | Zilberman |
| 2008/0103799 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0162383 A1 | 7/2008 | Kraft |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208726 A1 | 8/2008 | Tsantes et al. |
| 2008/0217400 A1 | 9/2008 | Portano |
| 2008/0244717 A1 | 10/2008 | Jelatis et al. |
| 2008/0256613 A1 | 10/2008 | Grover |
| 2008/0288430 A1 | 11/2008 | Friedlander et al. |
| 2008/0288790 A1 | 11/2008 | Wilson |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024636 A1 | 1/2009 | Shiloh |
| 2009/0026270 A1 | 1/2009 | Connell, II et al. |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106153 A1 | 4/2009 | Ezra |
| 2009/0106846 A1 | 4/2009 | Dupray et al. |
| 2009/0119299 A1 | 5/2009 | Rhodes |
| 2009/0125439 A1 | 5/2009 | Zarikian et al. |
| 2009/0126013 A1 | 5/2009 | Atwood et al. |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0204457 A1 | 8/2009 | Buhrmann et al. |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0222362 A1 | 9/2009 | Stood et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0004965 A1 | 1/2010 | Eisen |
| 2010/0024037 A1 | 1/2010 | Grzymala-Busse et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0095357 A1 | 4/2010 | Willis et al. |
| 2010/0100406 A1 | 4/2010 | Lim |
| 2010/0131273 A1 | 5/2010 | Aley-Raz et al. |
| 2010/0132043 A1 | 5/2010 | Bjorn et al. |
| 2010/0145847 A1 | 6/2010 | Zarikian et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0205662 A1 | 8/2010 | Ibrahim et al. |
| 2010/0218255 A1 | 8/2010 | Ritman et al. |
| 2010/0229225 A1 | 9/2010 | Sarmah et al. |
| 2010/0229230 A1 | 9/2010 | Edeki et al. |
| 2010/0241501 A1 | 9/2010 | Marshall |
| 2010/0250364 A1 | 9/2010 | Song et al. |
| 2010/0250411 A1 | 9/2010 | Ogrodski |
| 2010/0275265 A1 | 10/2010 | Fiske et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325442 A1* | 12/2010 | Petrone .................. G06F 21/32 713/186 |
| 2010/0332292 A1 | 12/2010 | Anderson |
| 2011/0016042 A1 | 1/2011 | Cho et al. |
| 2011/0040983 A1 | 2/2011 | Grzymala-Busse et al. |
| 2011/0060905 A1 | 3/2011 | Stack et al. |
| 2011/0119291 A1 | 5/2011 | Rice |
| 2011/0126024 A1* | 5/2011 | Beatson .................. G06F 21/32 713/186 |
| 2011/0270727 A1 | 11/2011 | Kasower |
| 2011/0276496 A1 | 11/2011 | Neville et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2013/0004033 A1* | 1/2013 | Trugenberger ......... G06F 21/32 382/125 |

OTHER PUBLICATIONS

Aad et al, NRC Data Collection and Privacy by Design Principles, IEEE, Nov. 2010, pp. 1-5.*
Young, Lee W., "International Search Report" prepared for PCT/US11/33940 as mailed Aug. 22, 2011, 3 pages.
Ross, et al., U.S. Appl. No. 13/093,664, filed Apr. 25, 2011.
Gottschalk, Jr., U.S. Appl. No. 13/236,687, filed Sep. 20, 2011.
Gottschalk, U.S. Appl. No. 13/398,471, filed Feb. 16, 2012.
Copenheaver, Blaine R., "International Search Report" for PCT/US2012/025456 as mailed May 21, 2012, 4 pages.

(56) References Cited

OTHER PUBLICATIONS

LeFebvre, F. et al., "A Robust Soft Hash Algorithm for Digital Image Signature", IEEE, 2003, pp. 495-498.

Khan, Muhammad Khurram, "An Efficient and Secure Remote Mutual Authentication Scheme with Smart Cards", IEEE, 2008, pp. 1-6.

* cited by examiner

SYSTEMS AND METHODS FOR SECURE AND EFFICIENT ENROLLMENT INTO A FEDERATION WHICH UTILIZES A BIOMETRIC REPOSITORY

CROSS-REFERENCE TO RELATED APPLICATIONS

This patent application is a continuation of, and incorporates by reference the entire disclosure of, U.S. patent application Ser. No. 13/236,687, filed on Sep. 20, 2011.

BACKGROUND

1. Technical Field

The invention relates generally to information security and more particularly, but not by way of limitation, to systems and methods for using a biometric repository.

2. History of Related Art

Identity theft is one of the fastest-growing crimes in the United States and worldwide. Identity theft generally involves a use of personally-identifying information (PII) that is not authorized by an owner of the PII. PII, as used herein, refers to information that can be used to uniquely identify, contact, or locate a person or can be used with other sources to uniquely identify, contact, or locate a person. PII may include, but is not limited to, social security numbers (SSN), bank or credit card account numbers, passwords, birth dates, and addresses. Identity theft may include, for example, an unauthorized change to PII or an unauthorized use of PII to access resources or to obtain credit or other benefits.

Businesses and consumers alike are victims of identity-theft crimes. For example, in 2008, approximately ten million U.S. adults were victims of identity theft and businesses suffered approximately $56 billion as a direct result thereof. The Identity Fraud Survey Report created by Javelin Strategy & Research found that victims averaged a personal cost of $373 and 21 hours of time to resolve their identity fraud issues in 2009. The annual cost of identity theft currently exceeds $200 billion worldwide. Given that identity theft is a high-reward/low-risk crime as described by the Federal Bureau of Investigation (FBI), it appears that identity theft will continue to increase.

Therefore, it is advantageous for businesses to implement security practices that reduce the occurrence of identity theft. Biometric security is an example of an effective form of security. Biometric security generally involves an ability to identify and/or verify an identity of an individual person based upon one or more intrinsic physical or behavioral traits such as, for example, voice, fingerprints, DNA, and the like. However, biometric security is often too expensive and complex to be a viable option for businesses.

SUMMARY OF THE INVENTION

In one embodiment, a method includes receiving data related to an individual, the data comprising a plurality of elements of personally-identifying information (PII). The method further includes building, via the plurality of elements of the PII, a compositional key for the individual. In addition, the method includes storing the compositional key and a biometric print for the individual as a biometric record in a biometric repository. The method also includes, via the compositional key, providing a plurality of federated entity (FE) computer systems with access to the biometric repository.

In one embodiment, a computer-program product includes a computer-usable medium having computer-readable program code embodied therein, the computer-readable program code adapted to be executed to implement a method. The method includes receiving data related to an individual, the data comprising a plurality of elements of personally-identifying information (PII). The method further includes building, via the plurality of elements of the PII, a compositional key for the individual. In addition, the method includes storing the compositional key and a biometric print for the individual as a biometric record in a biometric repository. The method also includes, via the compositional key, providing a plurality of federated entity (FE) computer systems with access to the biometric repository.

The above summary of the invention is not intended to represent each embodiment or every aspect of the present invention.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1A:
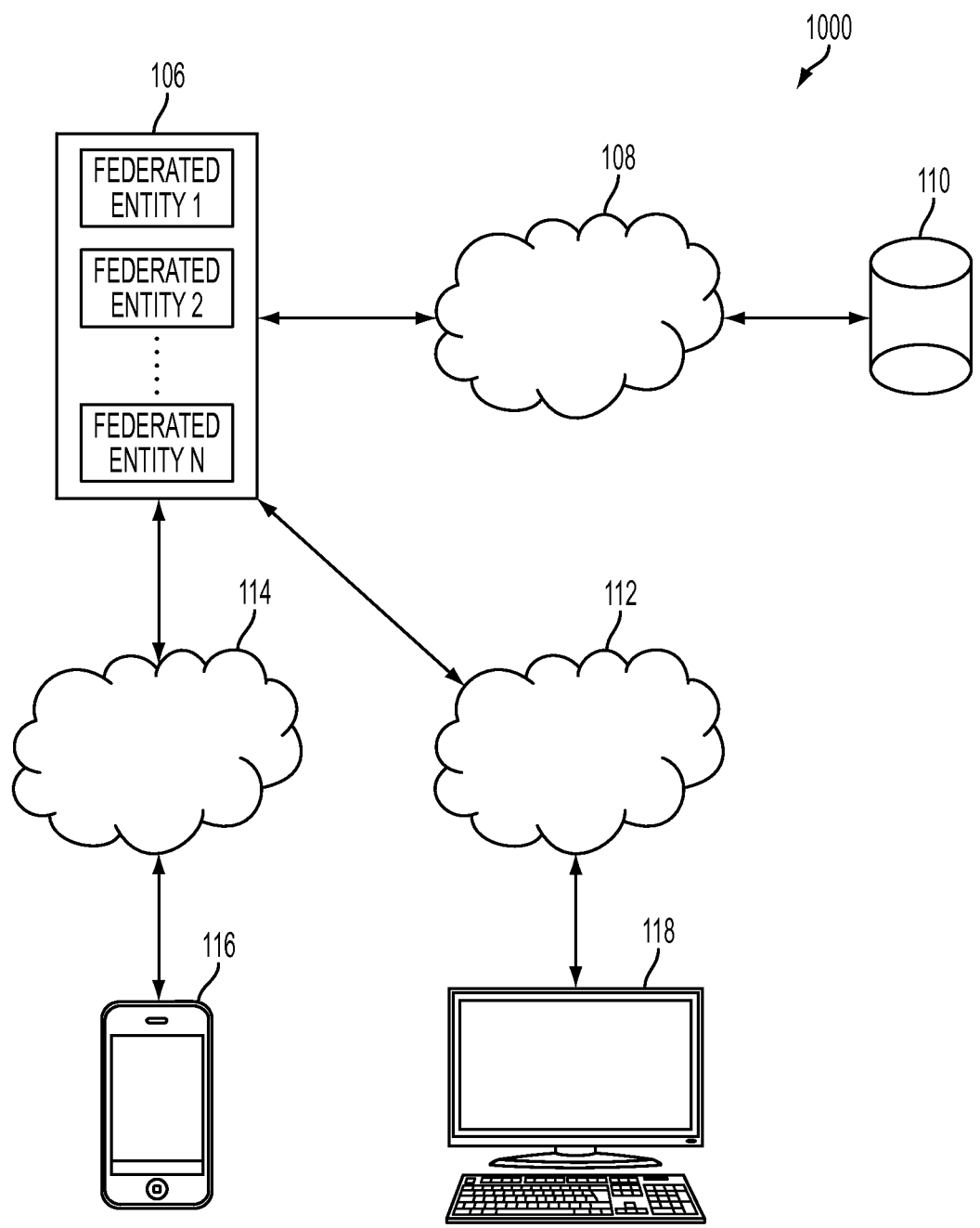
FIG. 1A shows an illustrative system for creating and maintaining a biometric repository.

In various embodiments, entities such as, for example, financial institutions, insurance companies, governmental entities, and goods or services providers, regularly carry out activities that involve personally-identifying information (PII) of members. For example, the entities may manage loans or bank accounts or maintain official records. PII, as used herein, refers to information that can be used to uniquely identify, contact, or locate a person or can be used with other sources to uniquely identify, contact, or locate a person. PII may include, but is not limited to, social security numbers (SSNs), bank or credit card account numbers, passwords, birth dates, and addresses. A member, as used herein, is an owner of PII and a person on behalf of whom entities such as, for example, the entities described above, may provide a good, service, or resource.

Activities that are performed with respect to members without proper authorization of the members may, in a typical embodiment, constitute identity theft. Identity theft generally involves, for example, an unauthorized change to PII or an unauthorized use of PII to access resources or to obtain credit or other benefits. In a typical embodiment, entities such as those described above may establish various security measures such as, for example, biometric security, in efforts to prevent identity theft. Biometric security generally includes an ability to identify and/or verify an identity of an individual person based upon one or more intrinsic physical or behavioral traits.

In a typical embodiment, biometric security involves obtaining a biometric sample from an individual and comparing the biometric sample to a stored biometric print for a member. For purposes of this patent application, a biometric print is a set of measurable biometric characteristics that uniquely identifies an individual. A biometric print may be, for example, a voiceprint, a fingerprint, a retinal print, a facial print, a DNA print, or the like. A biometric sample is generally a biometric specimen of a same type and form as a biometric print. A biometric sample is generally obtained from an individual, for example, for purposes of identifying the individual or authenticating the individual as a person to whom a particular biometric print corresponds.

In various embodiments, a particular person may be a member of multiple entities including, but not limited to, financial institutions, insurance companies, utility companies, governmental entities, and the like. In various embodiments, it is advantageous for entities such as those described above to share a common security resource such as, for example, a biometric repository of biometric prints. In various embodiments, the biometric repository facilitates identity-theft prevention that is more efficient and more effective than prior-art methods. Entities that share the biometric repository may be referenced herein as federated entities.

For purposes of illustration and to more fully explain various inventive principles to one of ordinary skill in the art, various examples of a biometric repository will be described below relative to voice-biometric security. Voice-biometric security typically involves comparing a person's voice to a voiceprint. A voiceprint, as used herein, is a set of measurable characteristics of a human voice that uniquely identifies an individual. Although several examples are provided with respect to voice-biometric security, one of ordinary skill in the art will appreciate that the principles described herein are not limited to voice-biometrics and may also be applied to other biometrics such as, for example, finger, retinal, facial, DNA, or the like.

FIG. 1A illustrates a system 1000 for creating and maintaining a biometric repository such as, for example, a voice-biometric repository. The system 1000 includes a plurality of federated-entity (FE) computer systems 106, a biometric repository 110, a communication device 116, and a computer 118. In a typical embodiment, each FE computer system in the plurality of FE computer systems 106 is operable to communicate with the communication device 116 via a network 114 that, for example, may be capable of carrying voice communication such as, for example, a public switch telephone network (PSTN), a cellular network, or the Internet. In a typical embodiment, each FE computer system in the plurality of FE computer systems 106 is operable to communicate with the biometric repository 110 via a network 108. In a typical embodiment, each FE computer system in the plurality of FE computer systems 106 is additionally operable to communicate with the computer 118 via a network 112.

For purposes of illustration, various networks are illustrated in FIG. 1A. However, one of ordinary skill in the art will appreciate that the depicted networks are illustrative in nature and should not be interpreted to mean that each network is necessarily separate or mutually exclusive from another network. For example, the network 114, the network 108, and the network 112 are illustrated separately in FIG. 1. However, in various embodiments, the network 114, the network 108, and the network 112 may each comprise a portion of the Internet. In various other embodiments, the network 114, the network 108, and the network 112 may indeed be separate networks.

In a typical embodiment, each FE computer system in the plurality of FE computer systems 106 corresponds to a distinct federated entity that provides a good, service, or resource for members. The communication device 116 is typically controlled by a member. The communication device 116 may be, for example, a wireline telephone, a wireless telephone, a smartphone telephone, a voice-over-internet-protocol (VOIP) telephone, a satellite telephone, a personal computer (PC), or any other device capable of receiving and transmitting voice communication. In a typical embodiment, the plurality of FE computer systems 106 are operable to perform text-to-speech (TTS) conversion and automated speech recognition (ASR) in order to communicate with the communication device 116.

In various embodiments, the system 1000 may be utilized for biometric security. For example, the plurality of FE computer systems 106 may be operable to utilize voice-biometric technology to verify members via voiceprints. During enrollment, for example, of a member who does not already have a voiceprint in the biometric repository 110, an FE computer system in the plurality of FE computer systems 106 may capture a voiceprint and transmit the voiceprint to the biometric repository 110 for storage. During verification of a member who has a voiceprint stored in the biometric repository 110, an FE computer system in the plurality of FE computer systems 106 may obtain the voiceprint and verify the member via the voiceprint. For example, in various embodiments, the member may be prompted to speak certain utterances (e.g., a random sequence of digits) and the speech may be analyzed against the voiceprint.

In a typical embodiment, the plurality of FE computer systems 106 may further operate as web servers and serve web pages to the computer 118 over the network 112. The network 112 may be, for example, the Internet. The computer 118 may be, for example, a desktop computer, a laptop computer, a smartphone, or the like. In various embodiments, the computer 118 may be operated by, for example, a member. The computer 118 may be equipped with, for example, a microphone or other recording device. Additionally, in various embodiments, the computer 118 may be operated at a kiosk by, for example, an agent for a business that utilizes the system 1000. The agent may, for example, correspond with members and relay information to the system 1000.

Figure 1B:
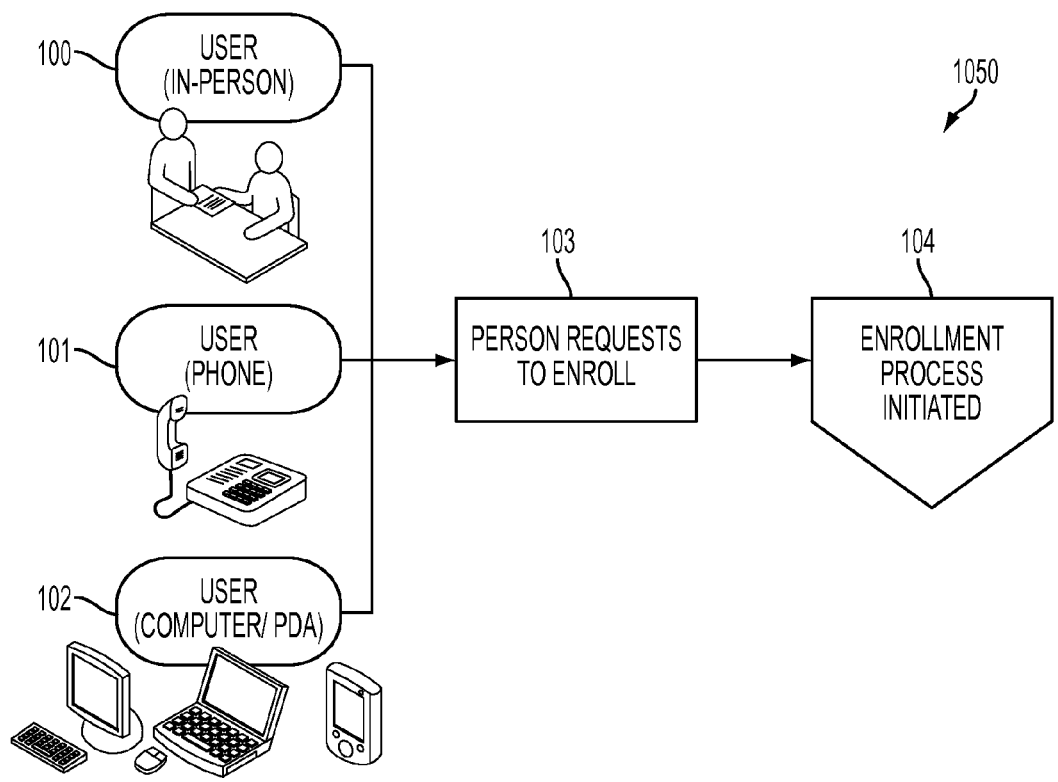
FIG. 1B describes an illustrative flow for initiating an enrollment process.

FIG. 1B illustrates a flow 1050 for initiating enrollment of a member into an FE computer system such as, for example, an FE computer system in the plurality of FE computer systems 106 of FIG. 1A. At step 103, the member requests to enroll in the FE computer system. In a typical embodiment, the member makes the request and accesses the FE computer system via various methods. The various methods may include, for example, person-to-person contact 100, voice communication 101, and computer communication 102.

In a typical embodiment, the person-to-person contact 100 involves the member personally appearing at a federated entity's physical location. In various embodiments, the person-to-person contact 100 may be required as a security measure if, for example, the member does not already have PII stored at the FE computer system. The person-to-person contact 100 optionally may be utilized in various other scenarios in order to provide, for example, increased security. During the person-to-person contact 100, an agent from the federated entity may directly speak to the member and operate a kiosk computer such as, for example, the computer 118, on behalf of the member.

In a typical embodiment, the voice communication 101 may be facilitated via a communication device such as, for example, the communication device 116 of FIG. 1A. For example, the FE computer system may receive a call from the communication device. In a typical embodiment, the voice communication 101 may be utilized if, for example, the member already has PII stored in the FE computer system. In a typical embodiment, ASR and TTS functionality may be utilized by the FE computer system to communicate with the communication device.

In a typical embodiment, the computer communication 102 may be facilitated via a member computer such as, for example, the computer 118 of FIG. 1A. The member computer is typically operated by the member. In a typical embodiment, the FE computer system communicates with the member over the Internet and is operable to serve one or more web pages.

From step 103, the flow 1050 proceeds to step 104. At step 104, the enrollment begins via the person-to-person contact 100, the voice communication 101, or the computer communication 102, as appropriate. The enrollment may include, for example, acquisition of PII, verification of an identity of the member, and capture of a biometric print (e.g., a voiceprint) of the member for storage in the biometric repository. The enrollment may, in a typical embodiment, further include various other procedures that may be required by the FE. After step 104, the flow 1050 ends.

Figure 2:
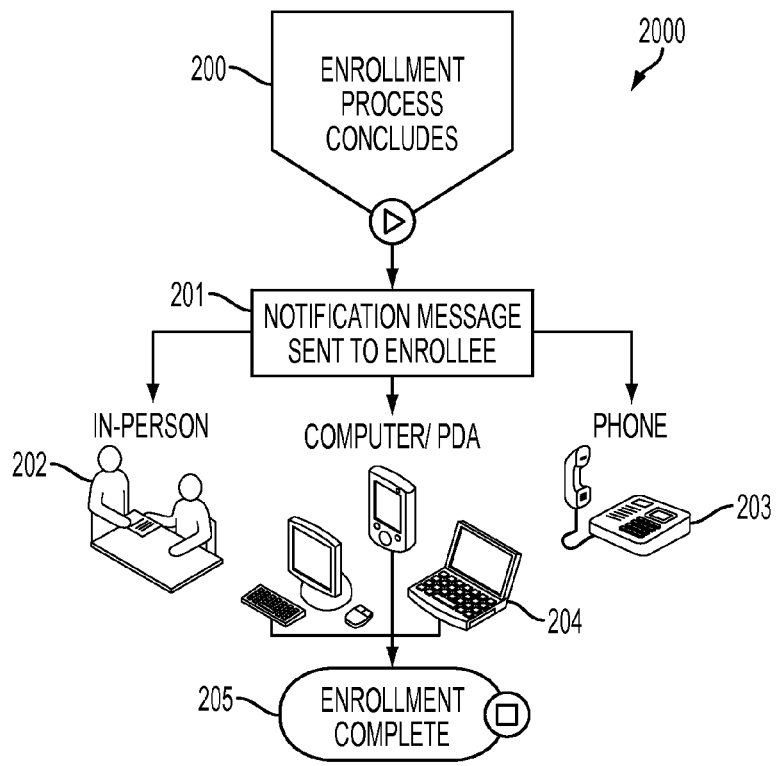
FIG. 2 describes an illustrative flow for concluding an enrollment process.

FIG. 2 illustrates a flow 2000 for concluding an enrollment process into an FE computer system. The enrollment process may be, for example, the enrollment at step 104 of FIG. 1B. At step 200, the enrollment process concludes. From step 200, the flow 2000 proceeds to step 201. At step 201, a notification is communicated from an FE computer system such as, for example, an FE computer system in the plurality of FE computer systems 106 of FIG. 1A. In a typical embodiment, the notification indicates whether the enrollment process was successful or unsuccessful. In a typical embodiment, the enrollment process may be deemed successful if, for example, no unresolved exceptions remain. An exception may be, for example, a failure to verify an identity of the member, a failure to obtain a biometric print, and the like. In a typical embodiment, if an unresolved exception remains, the enrollment process may be deemed unsuccessful.

The notification may be communicated to the member via various methods according to how the enrollment process was initiated. The various methods may include, for example, person-to-person communication 202, voice communication 203, and computer communication 204. If the member initiated the enrollment process via, for example, the person-to-person communication 100 of FIG. 1B, the agent may receive the notification via the kiosk computer and personally relay the message to the member via the person-to-person communication 202. If the member initiated the enrollment process via, for example, the voice communication 101 of FIG. 1B, the FE computer system may cause the notification to be delivered to the communication device of the member via the voice communication 203. If the member initiated the enrollment process via, for example, the computer communication 102 of FIG. 1B, the FE computer system may cause the notification to be delivered to the member computer via the computer communication 204. From step 204, the flow 2000 proceeds to step 205. At step 205, the flow 2000 ends.

Figure 3:
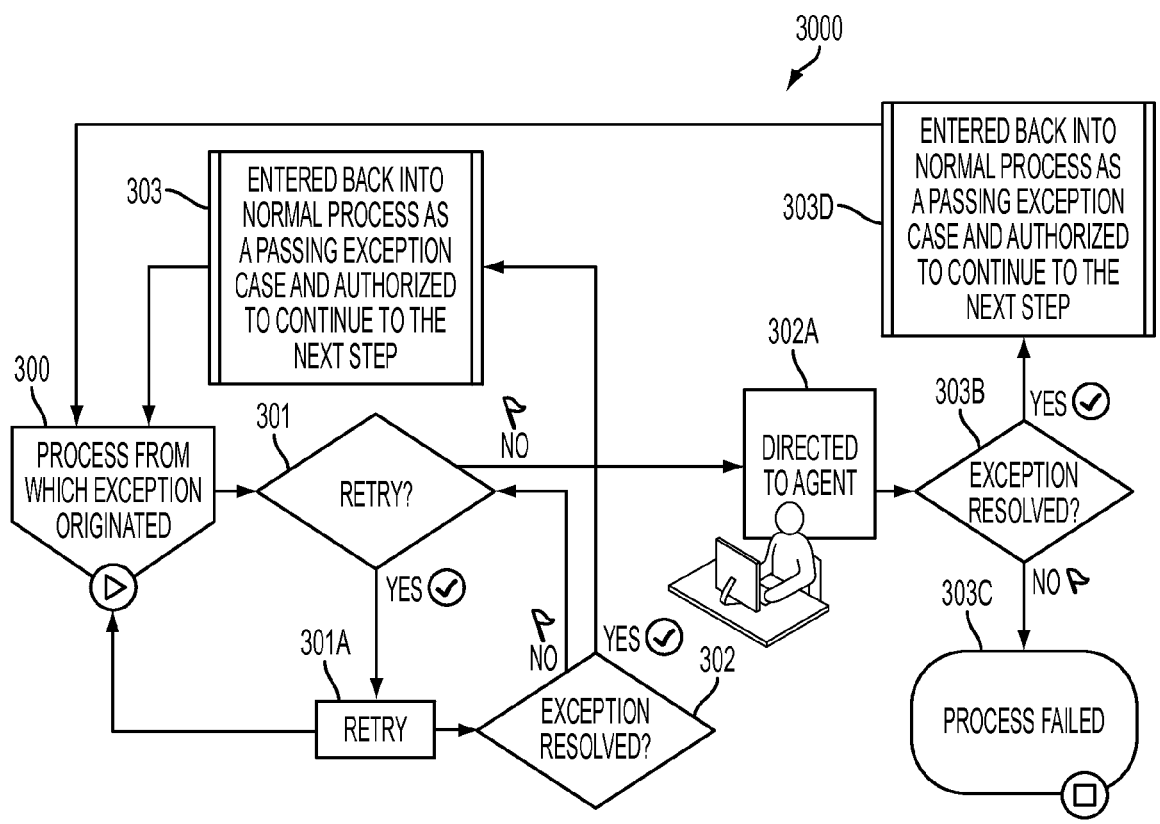
FIG. 3 describes an illustrative exception-handling process.

FIG. 3 describes an illustrative exception-handling process 3000. At step 300, the exception-handling process 3000 is initiated. In a typical embodiment, the exception-handling process 3000 may be initiated by an exception in an enrollment process for a member such as, for example, the enrollment processes described with respect to FIGS. 1B and 2. The exception-handling process 3000 typically handles exceptions that occur via voice communication or computer communication. The exception may be caused by a failure such as, for example, a failure in verifying an identity of the member, a failure in obtaining a biometric print from the member, or another type of failure. From step 300, the exception-handling process 3000 proceeds to step 301.

At step 301, it is determined whether the member will be given an opportunity to resolve the exception via a retry. In a typical embodiment, the member is given a predefined number of attempts to resolve the exception. For example, during an identity-verification process, the member may be given another opportunity to correctly answer an incorrectly-answered question. By way of further example, during a voice-print-capture process, the member may be given another opportunity to provide a voiceprint that meets, for example, pre-established quality standards. If the member has not exceeded the predefined number of attempts, the exception-handling process 3000 proceeds to step 301A.

At step 301A, the member is given an opportunity to resolve the exception via a retry. From step 301A, the process 3000 proceeds to step 302. At step 302, it is determined whether the exception has been resolved by the retry. If the member has failed to resolve the exception at step 301A, the failed attempt is logged and the exception-handling process 3000 returns to step 301 for a determination of whether the member will be provided another retry. If the member resolves the exception at step 301A, the exception-handling process 3000 proceeds to step 303. From step 303, the exception-handling process 3000 returns to step 300 so that the member can exit the exception-handling process 3000 as a passing exception.

Returning to step 301, if it is determined that the member will not be provided any additional attempts to resolve the exception, the exception-handling process 3000 proceeds to step 302A. At step 302A, the member is directed to an agent such as, for example, an agent of a federated entity or an agent for a biometric repository. In this way, the member may be given an opportunity to manually resolve the exception via consultation with the agent. The member may also be assigned a "potential fraud" tag. In a typical embodiment, the "potential fraud" tag locks an account of the member from being accessed except via communication with the agent. In that way, records for the member cannot be accessed or modified in an automated fashion via, for example, voice communication or computer communication.

From step 302A, the exception-handling process 3000 proceeds to step 303B. If the member has resolved the exception after consultation with the agent, the exception-handling process 3000 proceeds from step 303B to step 303D. At step 303D, the exception-handling process 3000 returns to step 300 so that the member can exit the exception-handling process 3000 as a passing exception. Returning to step 303B, if the member has failed to resolve the exception after consulting with the agent, the exception-handling process 3000 proceeds to step 303C. At step 303C, the member may be flagged for possible fraud and requested, for example, to personally appear at a physical location for a federated entity. After step 303C, the exception-handling process 3000 ends in failure.

In various embodiments, records from the exception and from all attempts to resolve the exception may be recorded in a database for the federated entity and/or the biometric repository. In some embodiments, the records may serve as a basis for future fraud detection. For example, if the exception resulted in a biometric sample being stored, the biometric sample may be stored as a fraudulent biometric print. In a typical embodiment, such fraudulent biometric prints may be automatically compared with all biometric samples received during, for example, an enrollment process or a biometric-verification process. If a match to a fraudulent biometric print is determined, fraud may be more quickly and efficiently flagged.

Figure 4:
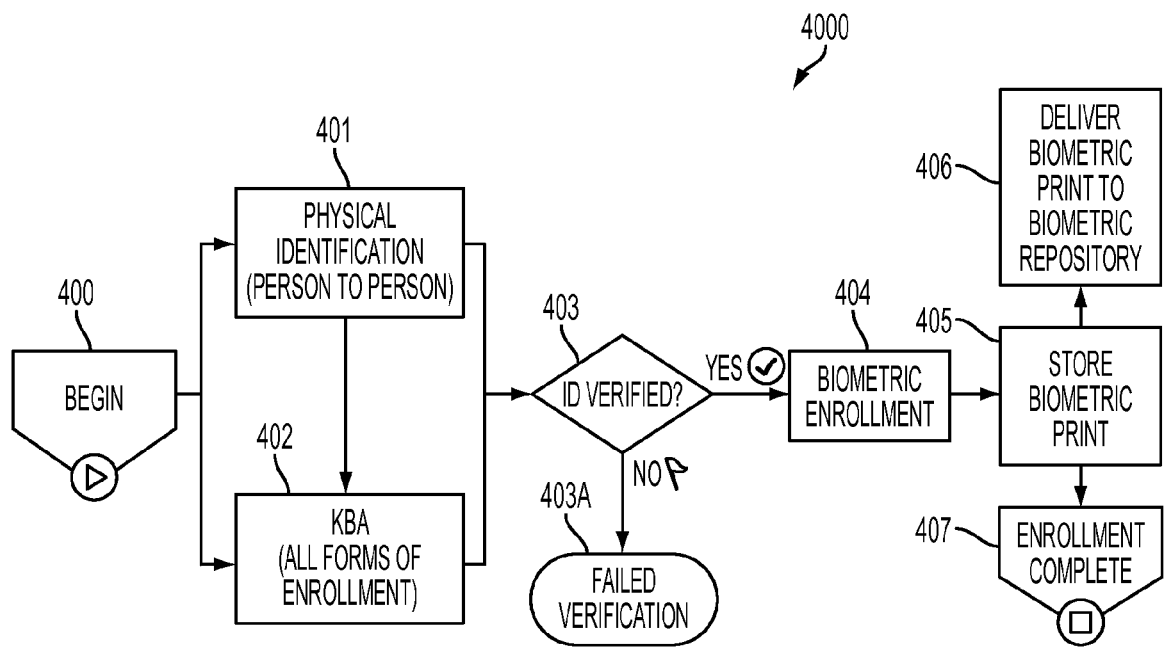
FIG. 4 describes an illustrative biometric enrollment process.

FIG. 4 describes an illustrative biometric enrollment process 4000 that may be facilitated via, for example, an FE computer system in the plurality of FE computer systems 106 of FIG. 1A. In a typical embodiment, the process 4000 may be performed as part of step 104 of FIG. 1B. At step 400, the process 4000 begins for a member. If the biometric-enrollment process is occurring via person-to-person communication as described with respect to FIG. 1B, the process 4000 proceeds from step 400 to step 401. At step 401, an agent conducting the process 4000 may require, for example, a photo identification and/or other documentary evidence. In various embodiments in which additional security is desired, the process 4000 proceeds from step 401 to step 402. In various other embodiments, the process 4000 proceeds from step 401 to step 403. At step 400, if the biometric-enrollment process is occurring via a method other than person-to-person communication as described with respect to FIG. 1B, the process 4000 proceeds to step 402.

At step 402, in a typical embodiment, the FE computer system verifies an identity of the member via knowledge-based authentication (KBA) questions. KBA questions are generally considered to be questions or combinations of questions that only a person having a particular identity should be able to answer. In various embodiments, the FE computer system may generate the KBA questions using data records accessed via, for example, PII provided by the member. The KBA questions may be generated in real time and based on information in one or more of public records, compiled marketing data, and credit reports for the identity being asserted. Therefore, the KBA questions may relate to, for example, loan information, insurance information, previous addresses and phone numbers, and other information that generally only the owner of a particular identity should know.

In a typical embodiment, step 402 includes creation of the KBA questions, solicitation of answers to the KBA questions from the member, and verification whether the answers to the KBA questions are correct. The KBA questions may be presented, for example, via person-to-person communication, voice communication, or computer communication as described with respect to FIG. 1B. The KBA questions help ensure that the member is who they are claiming to be. From step 402, the process 4000 proceeds to step 403.

At step 403, if the identity of the member at step 401 and/or step 402 is determined to have been verified, the process 4000 proceeds to step 404 for capture of a biometric print. Otherwise, if the identity of the member at step 401 and/or step 402 is determined to have not been verified, an exception is generated and the process 4000 proceeds to step 403A. At step 403A, an exception-handling process similar to the exception-handling process 3000 of FIG. 3 may be conducted. It should be appreciated that steps 401-403A are presented above in order to provide examples of identity verification to one of one of ordinary skill in the art. After studying these examples, one of ordinary skill in the art will appreciate that many alternative methods and instrumentalities for identity verification may be substituted for all or part of steps 401-403A without deviating from the inventive principles described herein.

At step 404, biometric enrollment occurs. Biometric enrollment typically involves capturing a biometric print. For example, if the biometric print is a voiceprint, the FE computer system may prompt the member to utter a series of phrases. If the process 4000 is occurring via person-to-person communication, the agent may direct the member to use, for example, a microphone communicably coupled to a computer at a kiosk. In various embodiments, particular phrases, a number of phrases, and phrase length are each configurable. After the FE computer system has captured the biometric print of the member, at step 405, the biometric print is stored in an FE database. After step 405, steps 406 and 407 may occur in parallel, although this need not necessarily be the case. At step 406, the biometric print is delivered from the FE database to a biometric repository shared by multiple FEs. At step 407, the member is provided confirmation via, for example, person-to-person communication, voice communication, or computer communication, that the biometric print has been saved. After steps 406 and 407, the process 4000 concludes.

Figure 5:
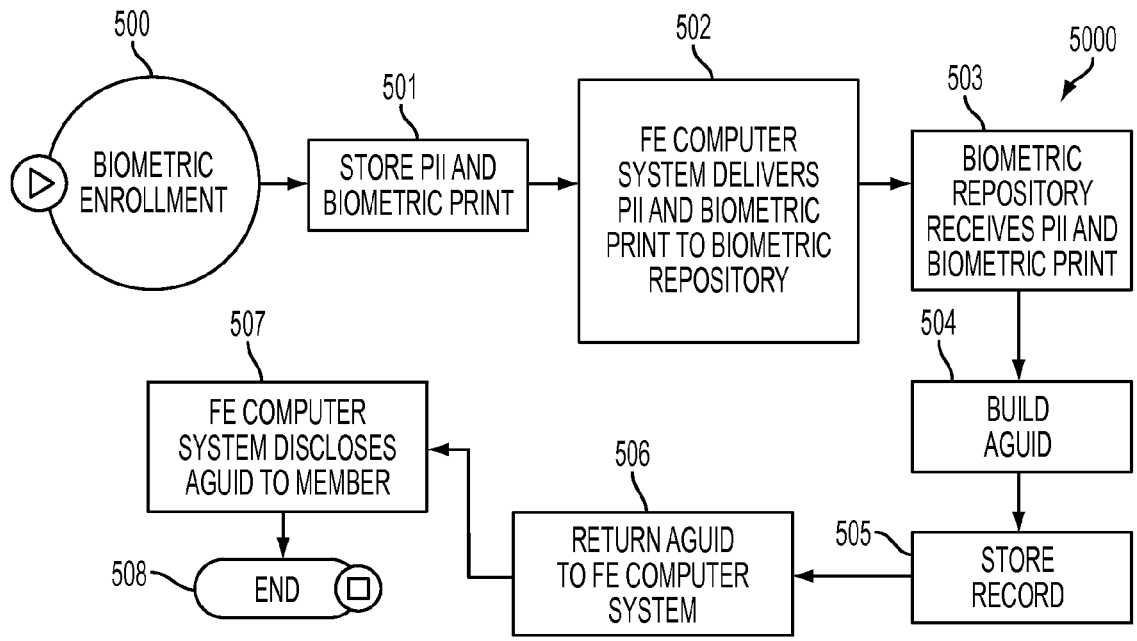
FIG. 5 describes an illustrative process for creating and assigning an almost globally unique identifier (AGUID)

FIG. 5 describes an illustrative process 5000 for creating and assigning a compositional key, referred to herein as an almost globally unique identifier (AGUID). As one of ordinary skill in the art will appreciate, a globally unique identifier (GUID) is a unique reference number that, ideally, will never be generated twice by any computer in existence. Thus, a GUID may be considered a collision-free identifier. A GUID may be represented, for example, as a 32-character hexadecimal string (e.g., F87C34A4-5B7D-3947-D56E-45237B45D231) and stored as a 128-bit integer. By design, a GUID is not reproducible. Therefore, one of ordinary skill in the art will understand that a problem may arise if a particular GUID is lost. In contrast, an AGUID, as used herein, is a reference number that, in all practicality, is a unique reference number. However, an AGUID is reproducible. Creation of an AGUID will be described in more detail below.

The process 5000 begins at step 500. At step 500, an enrollment process such as, for example, the biometric-enrollment process 4000 of FIG. 4, occurs with respect to a member. In a typical embodiment, the enrollment process of step 500 results in PII and a biometric print of the member being stored in a database for an FE computer system such as, for example, an FE computer system in the plurality of FE computer systems 106 of FIG. 1A. From step 500, the process 5000 proceeds to step 501.

At step 501, the FE computer system stores the PII and the biometric print from the enrollment process of step 500. From step 501, the process 5000 proceeds to step 502. At step 502, the FE computer system transmits the PII of the member and the biometric print to a biometric repository that may be shared by multiple FEs. From step 502, the process 5000 proceeds to step 503. At step 503, the biometric repository receives the PII and the biometric print. From step 503, the process 5000 proceeds to step 504.

At step 504, an AGUID for the member is created. In a typical embodiment, the AGUID is created via a one-way hashing function that is almost collision-free. Although no hashing function is absolutely collision free, one of ordinary skill in the art will appreciate that collisions can be made extremely unlikely. The one-way hashing function may use, for example, elements of the PII of the member as input. Various hashing functions may be utilized such as, for example, SHA-1, SHA-2, and MD5. In a typical embodiment, the AGUID is a compositional key created using a set of n elements of the PII, where n is greater than one. The n elements may include, for example, a name, a social-security number, and the like.

The AGUID may be reproduced in whole or in part by again providing all or part of the PII as input to the one-way hashing function. The one-way hashing function may not be inverted without extreme computational complexity. For purposes of simplicity, it may be said that the one-way hashing function cannot be inverted to produce the input. From step 504, the process 5000 proceeds to step 505.

At step 505, the biometric repository stores the AGUID and the biometric print of the member as a record. From step 505, the process 5000 proceeds to step 506. At step 506, the biometric repository returns a record that includes the AGUID to the FE computer system for storage. From step 506, the process 5000 proceeds to step 507. At step 507, the FE computer system discloses the AGUID to the member. In some embodiments, from step 507, the process 5000 proceeds to step 508. At step 508, the process 5000 ends.

As described above, in a typical embodiment, an AGUID is created as a secure representation of PII that cannot, as a practical matter, be inverted to reproduce the PII. In a typical embodiment, AGUIDs eliminate the need for a biometric repository to store and maintain PII for purposes of identifying biometric prints, indexing biometric prints, or serving requests for biometric verification. Rather, in a typical embodiment, AGUIDs serve to securely identify biometric prints and the biometric repository is indexed by AGUID. Further, as described in greater detail with respect to FIGS. 7 and 8, the biometric repository may provide AGUID-based access to biometric-verification services. In that way, a point of access to PII (and a potential source for compromise) may be eliminated and the frequency at which PII must be transmitted or shared may be reduced. Although, in various embodiments, there may be various benefits of not storing PII in a biometric repository, one of ordinary skill in the art will appreciate that biometric repositories as described herein are not prevented from storing PII in embodiments in which it is advantageous or necessary to do so.

Figure 6:
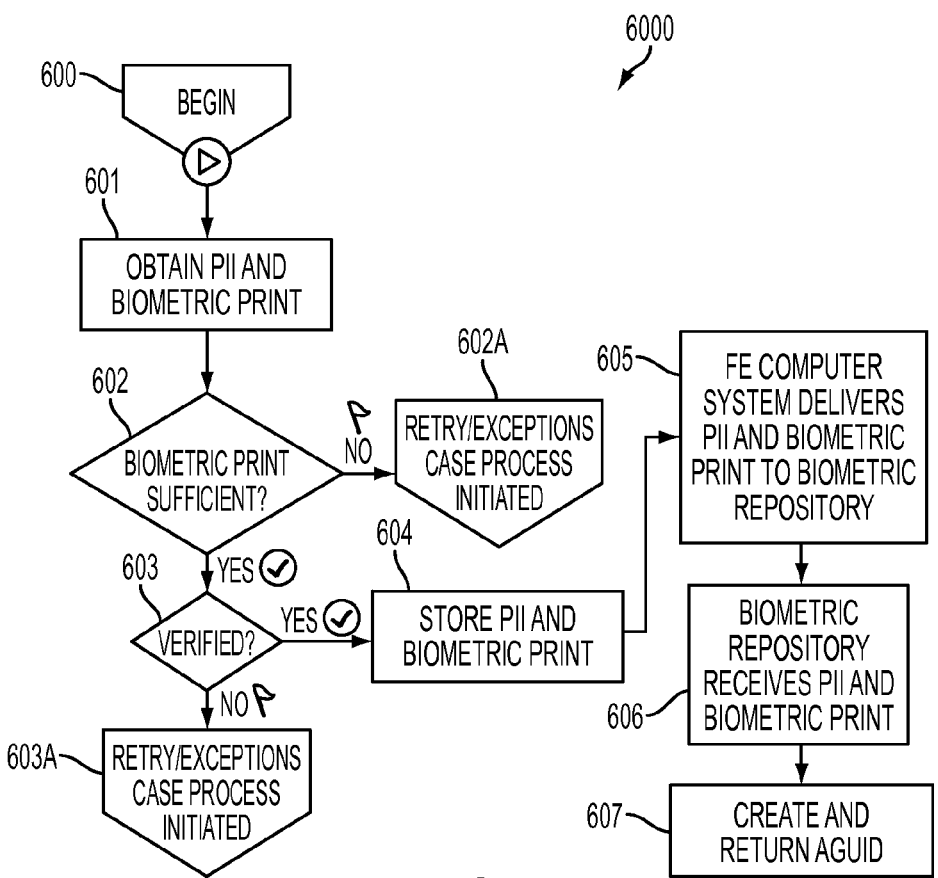
FIG. 6 describes an illustrative enrollment process that utilizes a biometric repository.

FIG. 6 illustrates an enrollment process 6000 that utilizes a biometric repository operable to return an AGUID. The enrollment process 6000 begins at step 600. In a typical embodiment, at step 600, a member makes a request for enrollment in an FE computer system via, for example, person-to-person communication, voice communication, or computer communication as described with respect to FIG. 1B. From step 600, the enrollment process 6000 proceeds to step 601. At step 601, the FE computer system obtains and stores PII and a biometric print of the member. For example, if the biometric print is a voiceprint, the FE computer system may capture the voiceprint by prompting the member to utter a series of phrases. In various embodiments, the phrases, a number of phrases, and phrase length are configurable.

From step 601, the process 6000 proceeds to step 602. At step 602, the FE computer system determines whether the biometric print is sufficient according to predetermined quality standards (e.g., audio-quality standards). If the biometric print fails to meet the predetermined quality standards, the enrollment process 6000 proceeds to step 602A. At step 602A, an exception-handling process similar to the exception-handling process 3000 of FIG. 3 is conducted. If the biometric print obtained at step 602 meets the predetermined quality standards, the enrollment process 6000 proceeds to step 603.

At step 603, the FE computer system verifies the member's identity in similar fashion to that described with respect to steps 401-403 of FIG. 4. If the verification at step 603 fails, the enrollment process 6000 proceeds to step 603A. At step 603A, an exception-handling process similar to the exception-handling process 3000 of FIG. 3 is conducted. If the member's identity is verified at step 603, the enrollment process 6000 proceeds to step 604. At step 604, the FE computer system saves the biometric print, for example, within an encrypted database or file system. From step 604, the enrollment process 6000 proceeds to step 605. At step 605, the FE computer system transmits PII of the member and the biometric print to a biometric repository that is shared by multiple FEs. From step 605, the enrollment process 6000 proceeds to step 606.

At step 606, the biometric repository receives and stores the PII and the biometric print. From step 606, the process 6000 proceeds to step 607. At step 607, an AGUID for the member is created, for example, in a manner similar to that described with respect to step 504 of FIG. 5. In a typical embodiment, the biometric repository stores the AGUID and the biometric print of the member as a record. The biometric repository returns a record that includes the AGUID to the FE computer system for storage. In a typical embodiment, the FE computer system discloses the AGUID to the member. After step 607, the enrollment process 6000 ends.

Figure 7:
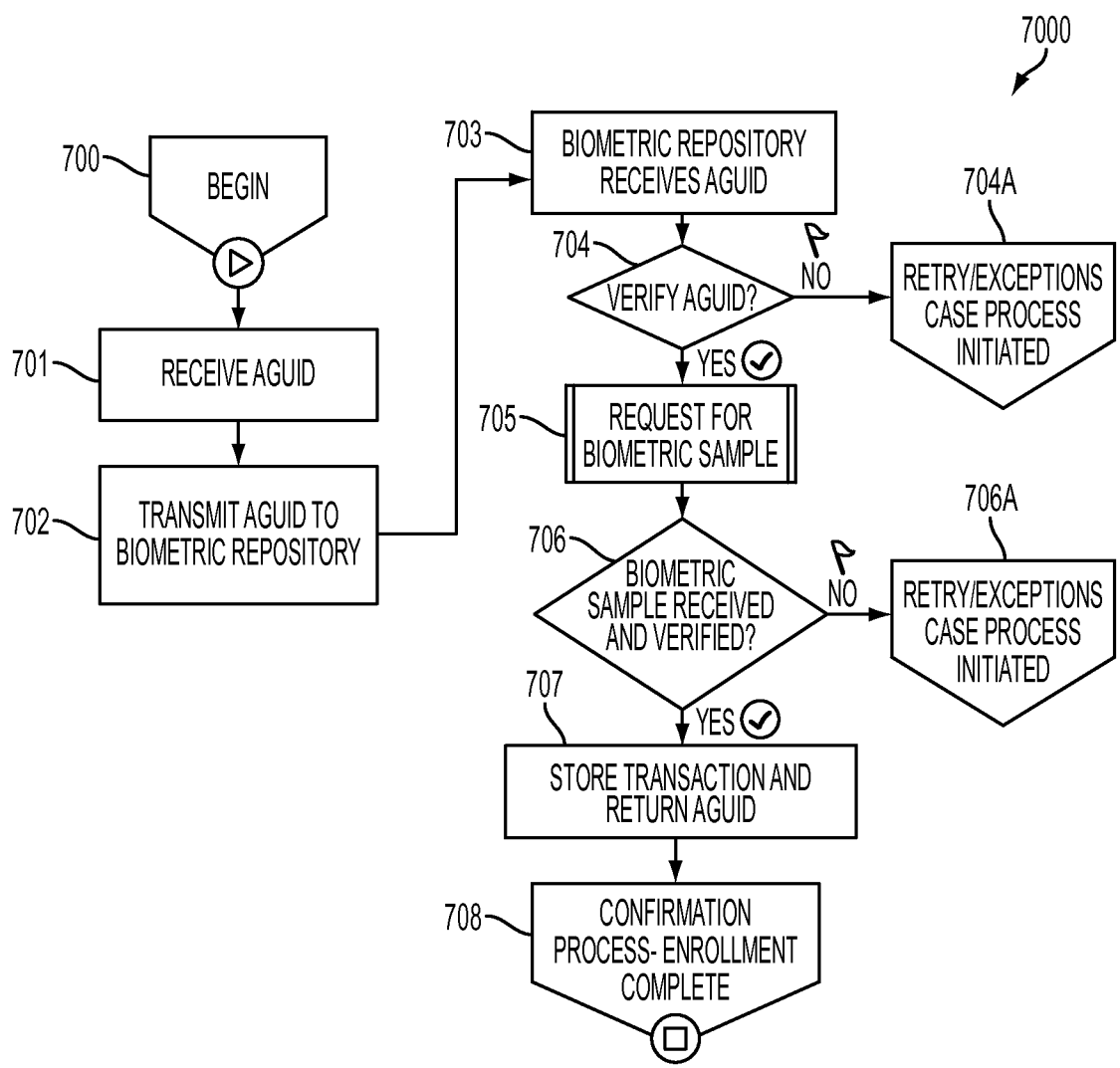
FIG. 7 describes an illustrative enrollment process that utilizes a biometric repository.

FIG. 7 illustrates a process 7000 for utilizing a biometric repository in connection with an enrollment into an FE computer system. The process 7000 illustrates enrollment when, for example, an AGUID has been previously assigned by a biometric repository. The process 7000 begins at step 700. In a typical embodiment, at step 700, a member makes a request for enrollment in the FE computer system via, for example, person-to-person communication, voice communication, or computer communication as described with respect to FIG. 1B. From step 700, the process 7000 proceeds to step 701. At step 701, the FE computer system prompts the member for an asserted AGUID. From step 701, the process 7000 proceeds to step 702.

At step 702, the FE computer system receives the asserted AGUID from the member and transmits the asserted AGUID to the biometric repository in connection with a biometric-verification request. From step 702, the process 7000 proceeds to step 703. At step 703, the biometric repository receives the asserted AGUID from the FE computer system. From step 703, the process 7000 proceeds to step 704. At step 704, the biometric repository verifies whether the asserted AGUID matches an existing AGUID stored therein. If the asserted AGUID does not match an existing AGUID stored in the biometric repository, the process 7000 proceeds to 704A. At step 704A, an exception-handling process such as the exception-handling process 3000 of FIG. 3 is conducted. At step 704, if the asserted AGUID matches an existing AGUID stored in the biometric repository, the process 7000 proceeds to step 705.

At step 705, the biometric repository requests and receives a biometric sample of the member from the FE computer system. For example, in a typical embodiment, the FE computer system obtains the biometric sample in a manner similar to that described with respect to step 601 of FIG. 6. From step 705, the process 7000 proceeds to step 706. At step 706, the biometric repository verifies the biometric sample against a biometric print associated with the existing AGUID in the biometric repository. In various embodiments, the biometric repository also verifies whether the biometric sample is of sufficient quality (e.g., audio quality for voice samples).

If the biometric sample fails the verification at step 706, the enrollment process 7000 proceeds to step 706A. At step 706A, an exception-handling process, such as the exception-handling process 3000 of FIG. 3, is conducted. If the biometric sample passes the verification at step 706, the process 7000 proceeds to step 707. At step 707, the biometric sample is paired with the AGUID and stored as a completed transaction in the biometric repository. From step 707, the process 7000 proceeds to step 708. At step 708, a notification confirming completion of the process 7000 may be communicated to the member by the FE computer system as described, for example, with respect to step 201 of FIG. 2. After step 708, the process 7000 ends.

FIG. 7 as described above depicts biometric verification in connection with a request for enrollment into an FE computer system. One of ordinary skill in the art will appreciate that the principles described with respect to FIG. 7 are not limited to requests for enrollment. In particular, a biometric repository such as, for example, the biometric repository described with respect to FIG. 7, may be utilized in a similar fashion to serve any type of biometric-verification request made by an FE computer system. In various embodiments, biometric-verification requests may be served on demand.

Figure 8:
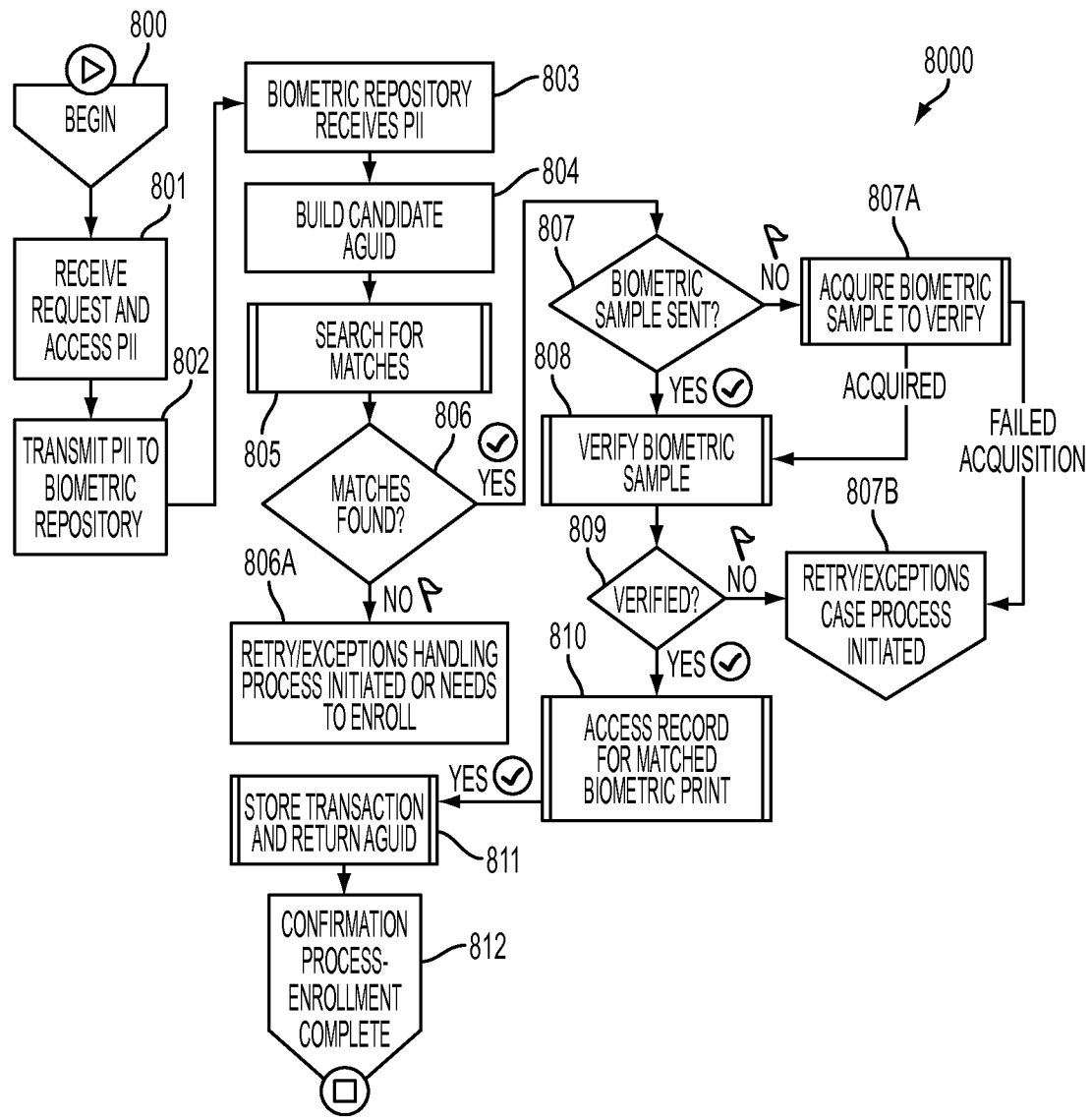
FIG. 8 describes an illustrative enrollment process that utilizes a biometric repository.

FIG. 8 illustrates a process 8000 for utilizing a biometric repository when, for example, it is believed that an AGUID for a member exists but the AGUID is not known. A variety of circumstances may cause the AGUID not to be known. For example, oftentimes the member may not remember the AGUID. By way of further example, the member may be uncertain as to whether enrollment into a biometric repository (and assignment of the AGUID) has previously occurred. The process 8000 may be used to address such scenarios. The process 8000 begins at step 800.

At step 800, a member makes a request for enrollment in an FE computer system via, for example, person-to-person communication, voice communication, or computer communication as described with respect to FIG. 1B. In a typical embodiment, the request includes a representation that enrollment has previously occurred but that the AGUID is not known. From step 800, the process 8000 proceeds to step 801. At step 801, the FE computer system receives the request and accesses PII of the member. From step 801, the process 8000 proceeds to step 802. At step 802, the FE computer system transmits the PII to the biometric repository. From step 802, the process 8000 proceeds to step 803.

At step 803, the biometric repository receives the PII. From step 803, the process 8000 proceeds to step 804. At step 804, the biometric repository builds a candidate AGUID for the member via the PII, for example, in a manner similar to that described with respect to step 504 of FIG. 5. From step 804, the process 8000 proceeds to step 805. At step 805, the biometric repository searches for records having an AGUID that at least partially matches the candidate AGUID. In various embodiments, the PII used to create the candidate AGUID may constitute all or part of a total set of PII that the biometric repository uses to create AGUIDs. If the PII represents only part of the total set of PII, one of ordinary skill will appreciate that partial matching may occur based that part.

From step 805, the process 8000 proceeds to step 806. At step 806, if no partial or complete matches are identified by the biometric repository at step 805, the process 8000 proceeds to step 806A. At step 806A, an exception-handling process such as the exception-handling process 3000 of FIG. 3 is conducted. In various embodiments, the exception-handling process may involve the member being required to begin a new enrollment session. If matches (partial or complete) are identified by the biometric repository at step 805, the process 8000 proceeds from step 806 to step 807.

At step 807, it is determined whether the FE computer system has already sent a biometric sample of the member. If not, the process 8000 proceeds from step 807 to step 807A. At step 807A, the biometric repository solicits the biometric sample from the FE computer system. If the biometric repository fails to receive the solicited biometric sample at step 807A, the process 8000 proceeds to step 807B. At step 807B, an exception-handling process such as the exception-handling process 3000 of FIG. 3 is conducted. If it is determined at step 807 that the FE computer system has already sent a biometric sample or if at step 807A the biometric sample is acquired, the process 8000 proceeds to step 808.

At step 808, the biometric repository verifies the biometric sample against biometric prints associated with the potential matches identified at step 806. In a typical embodiment, the verification involves comparing the biometric sample with the biometric prints and determining if the biometric sample matches any of the biometric prints. From step 808, the process 8000 proceeds to step 809. At step 809, if the biometric sample is determined at step 808 to match a single one of the biometric prints, the process 8000 proceeds to step 810. Otherwise, the process 8000 proceeds to step 807B. At step 807B, an exception-handling process such as the exception-handling process 3000 of FIG. 3 is conducted.

At step 810, the biometric repository accesses the record for the matched biometric print. From step 810, the process 8000 proceeds to step 811. At step 811, the biometric repository returns the record (which includes the AGUID) to the FE computer system for storage on the FE computer system. From step 811, the process 8000 proceeds to step 812. At step 812, a notification confirming receipt of the record may be communicated to the member by the FE computer system as described with respect to step 201 of FIG. 2. After step 812, the process 8000 ends.

FIG. 8 as described above depicts biometric verification in connection with a request for enrollment into an FE computer system. One of ordinary skill in the art will appreciate that the principles described with respect to FIG. 8 are not limited to requests for enrollment. In particular, a biometric repository such as, for example, the biometric repository described with respect to FIG. 8, may be utilized in a similar fashion to serve any type of biometric-verification request made by an FE computer system. In various embodiments, biometric-verification requests may be served on demand.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   receiving data related to an individual, the data comprising a plurality of elements of personally-identifying information (PII);
   building a compositional key for the individual as a function of at least some elements of the plurality of elements of PII;
   storing the compositional key and a biometric print for the individual as a biometric record in a biometric repository;
   via the compositional key, providing a plurality of federated entity (FE) computer systems with access to the biometric repository;
   receiving a request for biometric verification of an unverified individual from an FE computer system, the request comprising a representation that the unverified individual has an assigned compositional key that is not known, the request comprising PII;
   building a candidate compositional key as a function of at least some elements of the PII from the request;

identifying one or more compositional keys in the biometric repository that at least partially match the candidate compositional key; and verifying a biometric sample for the individual against a biometric print associated with each of the one or more compositional keys.

2. The method of claim 1, wherein the receiving comprises receiving the PII and the biometric print from an FE computer system of the plurality of FE computer systems.

3. The method of claim 2, comprising returning the compositional key to the FE computer system.

4. The method of claim 2, wherein the biometric record does not include the PII.

5. The method of claim 1, wherein the biometric print is selected from the group consisting of: a voiceprint; a fingerprint; a retinal print; a facial print; and a DNA print.

6. The method of claim 1, wherein the biometric print comprises a voiceprint.

7. The method of claim 1, wherein building the compositional key comprises utilizing a one-way hashing function.

8. The method of claim 1, comprising:
receiving an asserted compositional key from an FE computer system in connection with a biometric-verification request;
verifying whether the asserted compositional key matches an existing compositional key in the biometric repository; and
verifying a biometric sample against a biometric print associated with the existing compositional key.

9. The method of claim 8, wherein the biometric-verification request is made in connection with a request for enrollment into the FE computer system.

10. The method of claim 1, comprising:
responsive to the biometric sample for the individual matching exactly one biometric print in the verifying step:
considering the unverified individual to be verified; and
returning a record to the FE computer system, the record comprising a matching one of the one or more compositional keys.

11. The method of claim 1, wherein the request for biometric verification is in connection with a request for enrollment into the FE computer system.

12. A computer-program product comprising a non-transitory computer-usable medium having computer-readable program code embodied therein, the computer-readable program code adapted to be executed to implement a method comprising:
receiving data related to an individual, the data comprising a plurality of elements of personally-identifying information (PII);
building a compositional key for the individual as a function of at least some elements of the plurality of elements of PII;
storing the compositional key and a biometric print for the individual as a biometric record in a biometric repository;
via the compositional key, providing a plurality of federated entity (FE) computer systems with access to the biometric repository;
receiving a request for biometric verification of an unverified individual from an FE computer system, the request comprising a representation that the unverified individual has an assigned compositional key that is not known, the request comprising PII;
building a candidate compositional key as a function of at least some elements of the PII from the request;
identifying one or more compositional keys in the biometric repository that at least partially match the candidate compositional key; and
verifying a biometric sample for the individual against a biometric print associated with each of the one or more compositional keys.

13. The computer-program product of claim 12, wherein the receiving comprises receiving the PII and the biometric print from an FE computer system of the plurality of FE computer systems.

14. The computer-program product of claim 13, wherein the method comprises returning the compositional key to the FE computer system.

15. The computer-program product of claim 13, wherein the biometric record does not include the PII.

16. The computer-program product of claim 12, wherein the biometric print is selected from the group consisting of: a voiceprint; a fingerprint; a retinal print; a facial print; and a DNA print.

17. The computer-program product of claim 12, wherein the biometric print comprises a voiceprint.

18. The computer-program product of claim 12, wherein building the compositional key comprises utilizing a one-way hashing function.

* * * * *